L. A. WEHLE.
APPARATUS FOR USE IN PREPARING LIQUID OR SEMILIQUID MATERIALS.
APPLICATION FILED OCT. 30, 1920.

1,395,753.                    Patented Nov. 1, 1921.

INVENTOR
Louis A. Wehle,
by Parker & Brochures.
ATTORNEYS.

UNITED STATES PATENT OFFICE.

LOUIS A. WEHLE, OF BUFFALO, NEW YORK.

APPARATUS FOR USE IN PREPARING LIQUID OR SEMILIQUID MATERIALS.

1,395,753.  Specification of Letters Patent.  Patented Nov. 1, 1921.

Application filed October 30, 1920. Serial No. 420,810.

*To all whom it may concern:*

Be it known that I, LOUIS A. WEHLE, a citizen of the United States, residing at Buffalo, in the county of Erie and State of New York, have invented a new and useful Improvement in Apparatus for Use in Preparing Liquid or Semiliquid Materials, of which the following is a specification.

This invention relates to apparatus for use in preparing liquid or semi-liquid materials of the kind which might become damaged by fermentation or other chemical change in the material.

The objects of the invention are to construct an apparatus of this kind which can be inexpensively made so as to render the same available for household purposes as well as for use in manufacturing establishments; also to provide an apparatus of this kind which is of simple construction and which can be easily kept clean; also to improve the construction of apparatus of this kind in other respects hereinafter specified.

Figure 1:
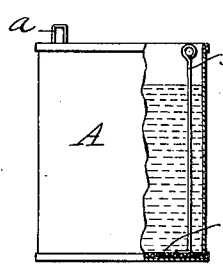
Figure 1 is an elevation, partly in section, of the kettle, boiler or inner vessel of an apparatus embodying the invention and showing a strainer in place therein.
Figure 2:
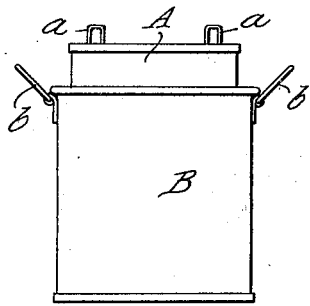
Fig. 2 is an elevation showing a cooler or outer vessel of the apparatus with the kettle or boiler arranged therein.
Figure 3:
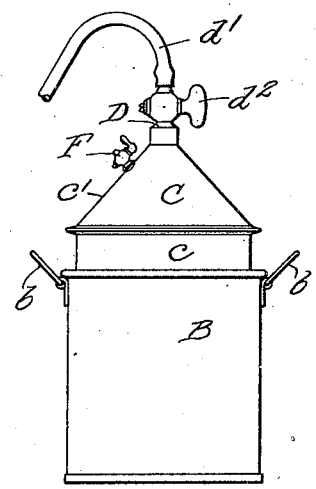
Fig. 3 is an elevation of the apparatus showing all parts of the apparatus in operative relation to each other.
Figure 4:
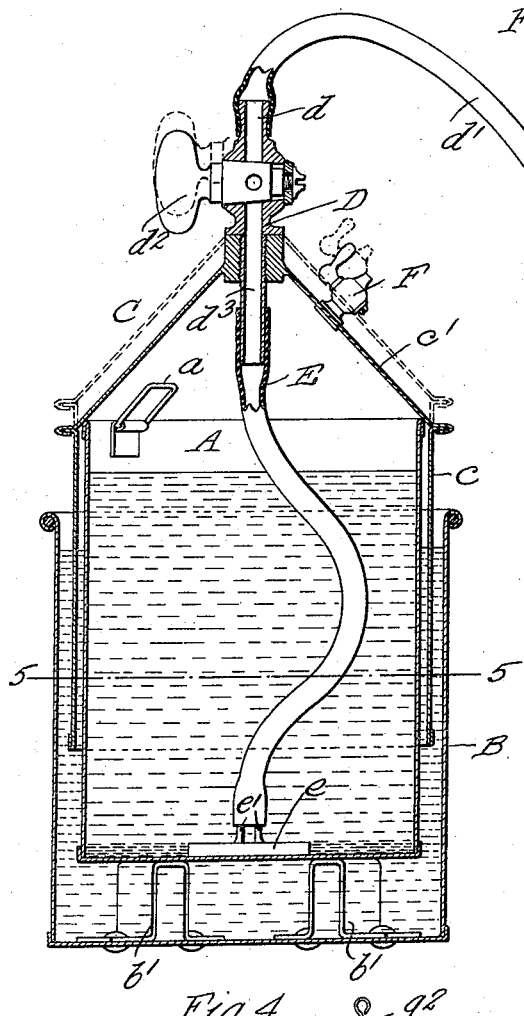
Fig. 4 is a sectional elevation thereof on an enlarged scale.
Figure 5:
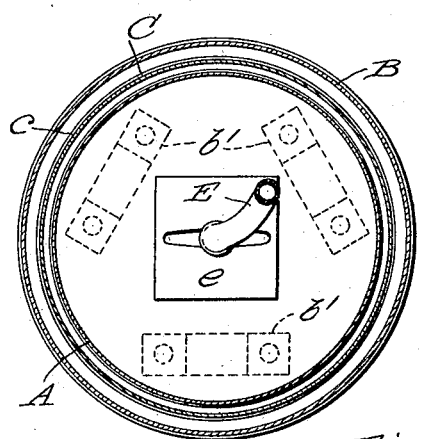
Fig. 5 is a sectional plan view thereof on line 5—5, Fig. 4.
Figure 6:
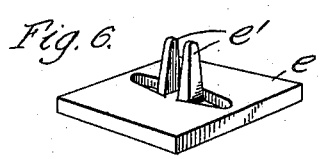
Fig. 6 is a perspective view showing a device for holding the drawing off or racking tube or hose in definite relation to the bottom of the kettle or boiler.
Figure 7:
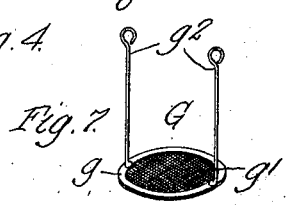
Fig. 7 is a detail view on a reduced scale of the sieve or strainer of the apparatus.

Briefly stated, the apparatus consists of an inner vessel, kettle or boiler in which the liquid or semi-liquid material may be boiled, and an outer vessel or cooler which may be filled with a cooling medium and into which the kettle or boiler may be inserted for quickly cooling the contents thereof, and a dome or seal member which is adapted to be inserted over the kettle or boiler and which extends within the outer vessel or cooler so as to form with the cooling liquid a liquid seal, and which excludes bacteria or other foreign matter in the air from entering into the liquid in the kettle.

A represents the kettle or boiler, which forms the inner vessel of the apparatus and which may be of any suitable or desired construction, being preferably cylindrical in form. The kettle or boiler, in the construction shown, is provided with ears or lugs $a$ by means of which the kettle may be readily lifted. B represents the outer vessel or cooler of the apparatus, which is preferably also cylindrical in form and is of larger diameter than the inner vessel or kettle A. The cooler may also be provided with bails or handles $b$ by means of which the apparatus may be readily handled. The outer vessel or cooler is preferably provided on its bottom with upwardly-extending parts or standards $b'$ which are secured to the bottom and extend upwardly therefrom and on which the inner vessel or kettle may rest. These standards support the kettle at a distance from the bottom of the outer vessel so that the cooling medium may circulate underneath the inner vessel or kettle A. The outer vessel or cooler is preferably made sufficiently large so that a hose or tube (not shown) may be inserted between the walls of the inner and outer vessels to admit cooling medium to the outer vessel.

C represents a dome, seal or inner tank, preferably having a lower, cylindrical portion $c$, which is slightly larger in diameter than the inner vessel or kettle A and smaller in diameter than the outer vessel B, and a tapering or conical portion $c'$ adjoining the upper end of the cylindrical portion $c$ and having an airtight connection therewith. This dome or seal may, if desired, be provided with means for drawing off the contents of the inner vessel and for this purpose is provided in its upper portion with a passage extending through the dome. This passage in the construction shown, includes a tubular housing D extending upwardly from the dome and having a nipple $d$ or other means for connecting with a flexible hose or tube $d'$ and if desired, a valve or cock $d^2$ may be provided in the tubular housing D. The lower end of the passage through the tubular housing D communicates with a pipe $d^3$ secured to the upper portion of the dome or seal and extending inwardly therefrom. To the end of this pipe a flexible rubber tube or hose E may be readily attached if desired, by passing the end of the tube E over the pipe $d^3$. The tube is preferably of sufficient length to reach the bottom of the inner vessel when the dome or seal is arranged at different elevations and if desired, the lower end of the tube E may be connected with any suitable device, such as a plate $e$, having upwardly-extending projections $e'$ to which the lower end of the tube may be connected. By means of this device the lower end of the tube may be held in any desired distance above the bottom of the inner vessel or kettle and thus prevent drawing off any sediment which may have formed in the bottom of the inner vessel.

F represents a valve or cock arranged in the upper part of the dome or seal and which may be used to admit air to or discharge it from the dome, for example during the drawing off of the liquid through the tubes E and $d'$, the cock must be opened to permit air to replace the liquid withdrawn from the inner vessel.

G represents a sieve or strainer which preferably includes a ring or frame $g$ which is made of such size as to fit closely into the interior of the inner vessel or boiler A. Screening material or wire mesh $g'$ is secured to the ring or frame $g$ and two arms $g^2$ extend upwardly from the ring or frame of the strainer so that the strainer may be withdrawn from the liquid to withdraw the solid or semi-solid material from the inner vessel. This sieve or strainer may be omitted in case it is desired to retain the solid or semi-solid material in the vessel, or in case no solid material is included in the material.

In the use of the apparatus described, the material is first boiled in the inner vessel or kettle A and if it is desired to quickly cool the material, the inner vessel is inserted into the outer vessel B and cold water or other cooling medium is circulated in the space between these two vessels. Preferably the cover or inverted tank C is placed over the inner vessel immediately after this vessel is placed into the water in the tank B, since the heat of the material in the inner vessel will then heat the air entrapped in the inner vessel and cover sufficiently to kill any bacteria which may be contained in this air. Consequently the material in the inner tank will remain sterile even after the liquid has cooled off since no impure air can enter into the air space above the material. The liquid seal between the inner and outer vessels enables the cover C to rise and fall as the entrapped air expands or contracts. Preferably, while the liquid is hot, the rubber tube E is omitted from the cover. If the material in the inner vessel contains solid or semi-solid matter the sieve or strainer is placed into the inner vessel before the solid or semi-solid matter is introduced, and the strainer can be withdrawn from the vessel together with the solid matter at any time. When it is desired to draw off the material in the inner vessel into bottles, jars or the like, the cover C is removed and the tubes E and $d'$ are attached thereto, after which the cover can be replaced. The valve F is then opened and the contents of the can may be readily siphoned into the desired containers. If it is desired to use the apparatus in connection with fermented beverages, such as root beer, near beer or the like, the fact that during the cooling of the material no unsterilized air is admitted to the liquid is very important since this prevents the growth of bacteria or fungus other than the desired yeast in the liquid while the same is being cooled and thus keeps the liquid from turning sour or spoiling. By boiling and fermenting the liquid in the same vessel, spoiling of the material is also prevented since the boiling thoroughly sterilizes the vessel. When the liquid has cooled, yeast may be introduced and by again replacing the cover and retaining the same in place during the fermentation the carbon dioxid gas will be confined in the space between the cover and the inner vessel and will have the tendency of keeping much of this gas in solution in the liquid owing to the slight pressure acting on the liquid due to the weight of the cover. Consequently, by means of this apparatus the liquid may be bottled under slight pressure of carbon dioxid gas, so that a large percentage of the gas necessary to make the beverage palatable, as much as 80 per cent. in some cases, is retained in the liquid while the same is bottled, thus eliminating much of the fermentation in the bottles, which is now necessary.

The apparatus is also useful in connection with materials in which fermentation is to be avoided, such for example as liquid polishes, proprietary medicines, or other materials which contain a certain amount of sugar. In the preparation of such materials fermentation is avoided by covering the material as described to prevent any fungus or bacteria from entering the material while the same is cooling. The apparatus also has the advantage that the parts thereof can be easily separated and can be readily cleaned when separated.

I claim as my invention:

1. The combination of an inner and an outer vessel arranged one partly within the other, and a cover arranged over said inner vessel and having a part extending into the space between said inner and outer vessels to form a liquid seal when said outer vessel contains liquid, the liquid in said outer vessel also serving to cool the contents of said inner vessel.

2. The combinations of two vessels, one of which is arranged partly within the other and at a distance from the side and bottom walls of said other vessel to form space for a cooling liquid, and a cover for the inner vessel which extends into the space between said two vessels to form a liquid seal to prevent air or gas from passing to or from said inner vessel.

3. The combination of a vessel, a cover for the vessel having a part extending around the outer sides of said vessel, and means for containing liquid to form a liquid seal between said cover and said vessel which permits the cover to rise and fall in accordance with the gas pressure acting on said vessel.

4. The combination of a vessel, a cover for the vessel having a part extending around the outer sides of said vessel, means for containing liquid to form a liquid seal between said cover and said vessel which permits the cover to rise and fall in accordance with the gas pressure acting on said vessel, and means secured on said cover and extending inwardly from the same through which the liquid may be withdrawn from said vessel.

5. The combination of a vessel, a cover for the vessel having a part extending around the outer sides of said vessel, means for containing liquid to form a liquid seal between said cover and said vessel, which permits the cover to rise and fall in accordance with the gas pressure acting on said vessel, and racking means extending through said cover through which the liquid may be withdrawn from said vessel, said racking means including a flexible tube, and means for holding the lower end of said tube at a definite distance from the bottom of the vessel independently of the position of said cover relatively to said vessel.

6. The combination of a vessel, a cover for the vessel having a part extending around the outer sides of said vessel, means for containing liquid to form a liquid seal between said cover and said vessel which permits the cover to rise and fall in accordance with the gas pressure acting on said vessel, and racking means extending through said cover and through which the liquid may be withdrawn from said vessel, said means including a valve.

7. The combination of a vessel, a cover for the vessel having a part extending around the outer sides of said vessel, means for containing liquid to form a liquid seal between said cover and said vessel which permits the cover to rise and fall in accordance with the gas pressure acting on said vessel, and a valve in said cover for permitting air or gas to flow into and out of said cover.

8. The combination of two vessels, one of which is arranged partly within the other and at a distance from the side and bottom walls of said other vessel to form space for a cooling liquid, a cover for the inner vessel which extends into the space between said two vessels to form a liquid seal to prevent air or gas from passing to or from said inner vessel, racking means extending through said cover and into said inner vessel, and an air valve also arranged in said cover.

LOUIS A. WEHLE.